(12) United States Patent
Toderici et al.

(10) Patent No.: US 10,713,818 B1
(45) Date of Patent: Jul. 14, 2020

(54) IMAGE COMPRESSION WITH RECURRENT NEURAL NETWORKS

(71) Applicant: Google LLC, Mountain View, CA (US)

(72) Inventors: George Dan Toderici, Mountain View, CA (US); Sean O'Malley, Mountain View, CA (US); Rahul Sukthankar, Orlando, FL (US); Sung Jin Hwang, Mountain View, CA (US); Damien Vincent, Zurich (CH); Nicholas Johnston, San Jose, CA (US); David Charles Minnen, Mountain View, CA (US); Joel Shor, Mountain View, CA (US); Michele Covell, Woodside, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/259,207

(22) Filed: Jan. 28, 2019

Related U.S. Application Data

(63) Continuation of application No. 15/424,711, filed on Feb. 3, 2017, now Pat. No. 10,192,327.

(60) Provisional application No. 62/291,389, filed on Feb. 4, 2016.

(51) Int. Cl.
*G06T 9/00* (2006.01)
*G06K 9/62* (2006.01)
*G06K 9/66* (2006.01)

(52) U.S. Cl.
CPC .......... *G06T 9/002* (2013.01); *G06K 9/6256* (2013.01); *G06K 9/66* (2013.01)

(58) Field of Classification Search
CPC .......... G06T 9/002; G06K 9/6256; G06K 9/66
See application file for complete search history.

(56) References Cited

U.S. PATENT DOCUMENTS

2003/0133611 A1\* 7/2003 Deco .................... G06K 9/6203
382/190

OTHER PUBLICATIONS

Liu et al: "Additive Neural Networks for Statistical Machine Translation", AMACL, 2013 (Year: 2013).\*
Chung et al., "Empirical Evaluation of Gated Recurrent Neural Networks on Sequence Modeling," (Dec. 11, 2014) [online] (retrieved from https://arxiv.org/pdf/1412.3555v1.pdf), 9 pages.
Cramer et al, "Low Bit-Rate Video Compression with Neural Networks and Temporal Subsampling," IEEE, 1996, 15 pages.

(Continued)

*Primary Examiner* — Ruiping Li
(74) *Attorney, Agent, or Firm* — Fish & Richardson P.C.

(57) ABSTRACT

Methods, and systems, including computer programs encoded on computer storage media for compressing data items with variable compression rate. A system includes an encoder sub-network configured to receive a system input image and to generate an encoded representation of the system input image, the encoder sub-network including a first stack of neural network layers including one or more LSTM neural network layers and one or more non-LSTM neural network layers, the first stack configured to, at each of a plurality of time steps, receive an input image for the time step that is derived from the system input image and generate a corresponding first stack output, and a binarizing neural network layer configured to receive a first stack output as input and generate a corresponding binarized output.

20 Claims, 6 Drawing Sheets

(56) References Cited

OTHER PUBLICATIONS

Danihelka et al., "Associative Long Short-term Memory," (May 19, 2016) [online] (retrieved from https://arxiv.org/pdf/1602.03032v2.pdf), 10 pages.
Donhahue et al, "Long-term Recurrent Convolutional Networks for Visual Recognition and Description," CVPR, 2005, 10 pages.
Sak et al., "Long Short-term Memory Based Recurrent Neural Network Architectures for Large Vocabulary Speech Recognition," (Feb. 5, 2014) [online] (retrieved from https://arxiv.org/pdf/1402.1128v1.pdf), 5 pages.

* cited by examiner

IMAGE COMPRESSION WITH RECURRENT NEURAL NETWORKS

CROSS-REFERENCE TO RELATED APPLICATIONS

This is a continuation of U.S. application Ser. No. 15/424,711, filed on Feb. 3, 2017, which claims priority to U.S. Provisional Application No. 62/291,389, filed on Feb. 4, 2016. The disclosures of the prior applications are considered part of and are incorporated by reference in the disclosure of this application.

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes methods and systems, including computer programs encoded on computer storage media, for performing image compression across different compression rates on images of arbitrary size using recurrent neural networks.

In general, one innovative aspect of the subject matter described in this specification can be embodied in a system that includes an encoder sub-network configured to receive a system input image and to generate an encoded representation of the system input image, the encoder sub-network comprising: a first stack of neural network layers comprising one or more LSTM neural network layers and one or more non-LSTM neural network layers, the first stack configured to, at each of a plurality of time steps, receive an input image for the time step that is derived from the system input image and generate a corresponding first stack output; and a binarizing neural network layer configured to receive a first stack output as input and generate a corresponding binarized output.

Other embodiments of this aspect include corresponding methods and computer programs recorded on one or more computer storage devices configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the generated second stack output is a reconstruction of the system input image.

In some implementations an input image for a time step that is derived from the system input image is a residual derived from a second stack output for the preceding time step.

In some implementations the generated binarized output is a compressed representation of the input image for the time step.

In some implementations the compressed representation of the input image has a predetermined number of bits.

In some implementations the number of bits in the compressed representation of the input image may be varied by varying a number of nodes in the binarizing neural network layer before training.

In some implementations the number of bits in the compressed representation of the input image corresponds to a number of rows in a linear weight matrix that is used to transform an activation from a previous layer in the neural network system.

In some implementations the binarizing neural network layer is further configured to: process the received first stack output to generate a binarizing neural network layer output with a predetermined number of outputs that is equal to a desired number of output bits, wherein the value of each output in the predetermined number of outputs is a real number in a continuous interval between −1 and 1; and for each output in the predetermined number of outputs, produce a corresponding discrete representation of the output in the set {−1,1}.

In some implementations the binarizing neural network layer is (i) a fully connected neural network layer with hyperbolic tangent activations, or (ii) a convolutional neural network layer followed by a stochastic binary sampler.

In some implementations the first stack of neural network layers comprises one or more LSTM neural network layers and one or more convolutional neural network layers, for example one convolutional neural network layer followed by two stacked LSTM layers, and the second stack of neural network layers comprises one or more LSTM neural network layers and one or more convolutional neural network layers, for example two stacked LSTM layers followed by a convolutional neural network layer.

In some implementations the first stack of neural network layers comprises one or more LSTM neural network layers and one or more convolutional LSTM neural network layers, and the second stack of neural network layers comprises one or more LSTM neural network layers and one or more deconvolutional LSTM neural network layers, for example wherein a final layer of the second stack of neural network layers comprises a convolution with three filers that converts a received final layer input into RGB values.

In some implementations the neural network system is trained using a single training procedure to learn to generate compressed representations of input images, wherein the training procedure does not depend on a dimension of the input images or a desired compression rate of the generated compressed representations of input images.

Another innovative aspect of the subject matter described in this specification can be embodied in a system that includes a decoder sub-network configured to receive an encoded representation of the system input image and to generate an output image that is a reconstruction of the system input image, the decoder sub-network comprising: a second stack of neural network layers comprising one or more LSTM neural network layers and one or more non-LSTM neural network layers, the second stack configured to, at each of a plurality of time steps, receive a binarized output for the time step and generate a corresponding second stack output.

Other embodiments of this aspect include corresponding methods and computer programs recorded on one or more computer storage devices configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the system further comprises: an encoder sub-network configured to receive a system input image and to generate an encoded representation of the system input image, the encoder sub-network comprising: a first stack of neural network layers comprising one or more LSTM neural network layers and one or more non-LSTM neural network layers, the first stack configured to, at each of a plurality of time steps, receive an input image for the time step that is derived from the system input image and generate a corresponding first stack output; and a binarizing neural network layer configured to receive a first stack output as input and generate a corresponding binarized output.

Another innovative aspect of the subject matter described in this specification can be embodied in a method for compressing an image that includes the actions of obtaining an initial input image; iteratively processing the initial input image and subsequent input images using a neural network system until a binarized output with target characteristics is achieved, each iteration comprising: processing the input image through a first stack of neural network layers comprising one or more LSTM neural network layers and one or more non-LSTM neural network layers to generate a corresponding first stack output; processing the first stack output through a binarizing neural network layer configured to generate a corresponding binarized output; processing the binarized neural network output through a second stack of neural network layers comprising one or more LSTM neural network layers and one or more non-LSTM neural network layers to generate a second stack output; and providing the generated second stack output as a subsequent input image for processing using the neural network system.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the target characteristics include one or more of (i) a target quality metric, and (ii) a target image compression rate.

In some implementations providing the generated second stack output as a subsequent input image for processing using the neural network system comprises providing a residual derived from the generated second stack output as a subsequent input image for processing.

In some implementations the initial input image is a patch of a larger image.

In some implementations the method further comprises processing each other patch of the larger image to generate corresponding binarized outputs with independent target characteristics for each other patch of the larger image, wherein the corresponding binarized outputs with target characteristics have varying image compression rates.

The subject matter described in this specification can be implemented in particular embodiments so as to realize one or more of the following advantages.

A system performing image compression with recurrent neural networks, as described in this specification, may efficiently compress received images across different image sizes and compression rates. Unlike other systems that perform image compression, the system described in this specification is not limited to images of a fixed size, but may be used to compress images of varying sizes. In addition, unlike other systems that perform image compression, the system described in this specification may enable a user of the system to specify a desired compression rate prior to performing the image compression.

A system performing image compression with recurrent neural networks, as described in this specification, is able to tradeoff between image quality and compression rate with a single, master neural network. The single neural network only needs to be trained once and can subsequently offer variable rate image compression, thus reducing computational resources required at training.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods and systems for performing image compression using recurrent neural networks. A neural network system includes an encoder recurrent neural network and a decoder recurrent neural network. Neural network system input images are first encoded using the encoder recurrent neural network, then binarized into binary codes which may be stored or transmitted to the decoder recurrent neural network. The decoder recurrent neural network constructs an estimate of the original input image based on the received binary code. The procedure is iteratively repeated with a residual error, i.e., the difference between the original image and the estimation from the decoder recurrent neural network. The neural network system weights are shared between iterations, and the internal states in the recurrent neural networks are propagated to the next iteration. Therefore, residual errors are encoded and decoded in different contexts in different iterations. The image compression rate is determined by the number of bits in the binary code generated at each iteration and by the total number of iterations performed by the system.

Figure 1:
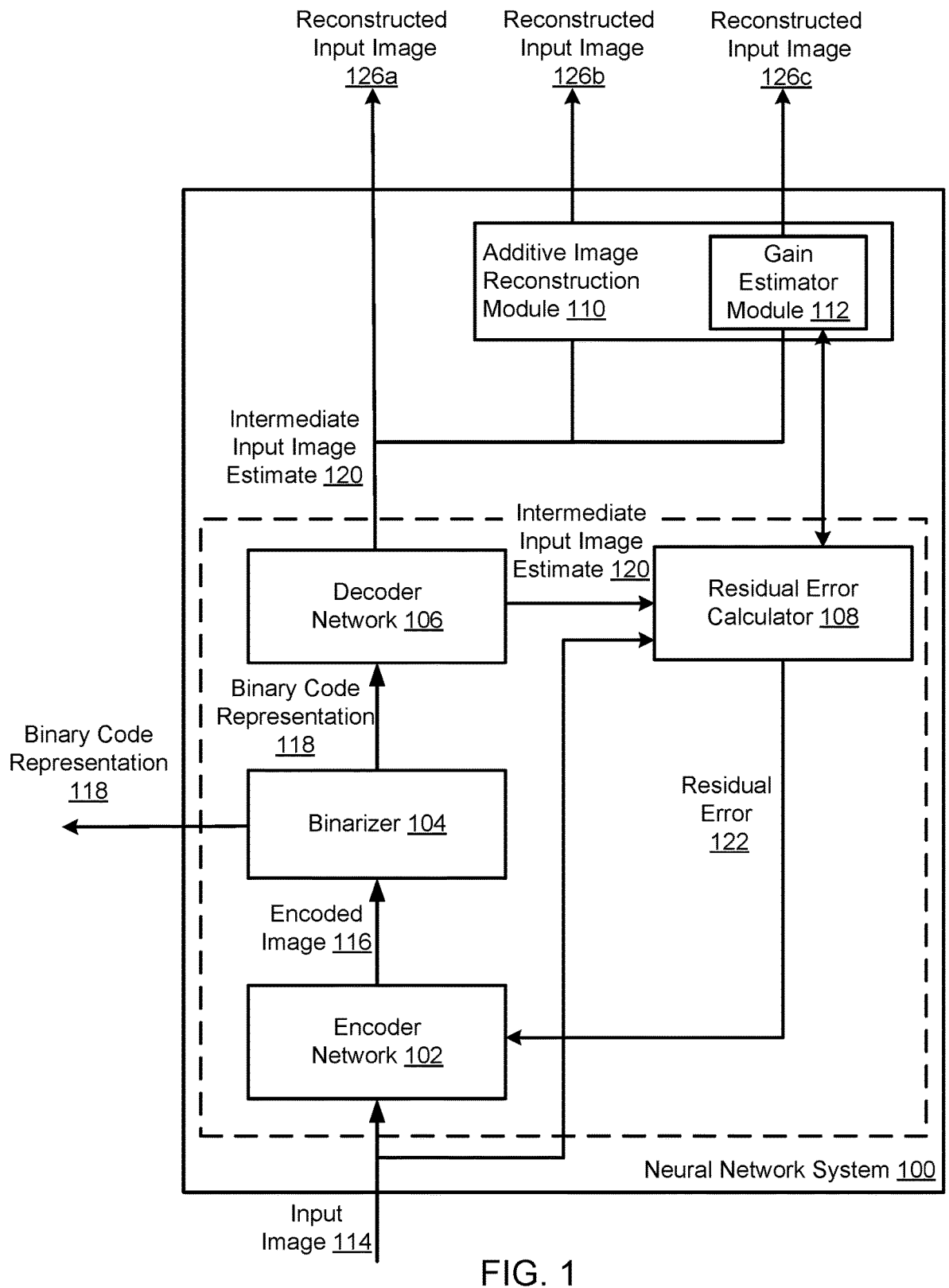
FIG. 1 shows an example neural network system for performing image compression.

FIG. 1 shows an example neural network system 100 for performing image compression. The neural network system 100 is an example of a system implemented as computer programs on one or more computers in one or more locations, in which the systems, components, and techniques described below can be implemented.

The neural network system 100 includes an encoder network 102, a binarizer 104, a decoder network 106, and a residual error calculator 108. For convenience, the binarizer 104 of FIG. 1 is shown as being separate to the encoder network 102, however in some implementations the binarizer 104 may be included in the encoder network 102. Optionally, the neural network system may include an additive image reconstruction module 110 and a gain estimator module 112.

The encoder network 102 is configured to receive a neural network system 100 input, e.g., data representing an input image 114. As described in more detail below, the encoder network 102 may also be configured to receive data representing a residual error between an intermediate reconstruction of an input image and the input image, e.g., residual error 122. The encoder network 102 is configured to process a received input, e.g., data representing input image 114 or residual error 122, to generate an encoded representation of the received input, e.g., data representing an encoded image 116.

In some implementations the encoder network 102 includes one or more recurrent network components, e.g., one or more recurrent neural network layers, that are configured to process data representing a sequence of input images for respective time steps. In these implementations, the encoder network 102 is configured to generate data representing a sequence of encoded representations of the input images. Encoder network weights that parameterize the encoder network 102 may be shared over each of the time steps, and the states of the recurrent network components for a current time step may be propagated to the next time step. An example encoder network 102 is described in more detail below with reference to FIG. 2.

The binarizer 104 is configured to receive data representing an encoded image input, e.g., encoded image 116, and to process the received data to generate a binary code representation of the encoded image, e.g., binary code representation 118. The binary code representation of the encoded input image is a compressed representation of the input image. For example, a generated binary code representation of an encoded input image may include a binarized stream of bits $\{-1, 1\}^m$, where m represents the number of generated bits. In some cases the number of generated bits m may be a predetermined number that is equal to a desired number of bits in the compressed input image.

In some implementations the binarizer 104 may be a neural network layer. For example, the binarizer may be a fully connected neural network layer with hyperbolic tangent activations, or a convolutional neural network layer that is followed by a stochastic binary sampler.

The binarizer neural network layer may be configured to process received data representing an encoded image input, e.g., encoded image 116, to generate a binarizing neural network layer output. The binarizing neural network layer output may include a number of outputs, where the value of each output is a real number in a continuous interval between −1 and 1. The binarizer neural network layer may then be configured to produce corresponding discrete representations of the outputs in the set $\{-1,1\}$. For example, the binarizer neural network layer may be configured to map real numbers in the interval [−1, 0) to −1, and real numbers in the interval [0, 1] to 1.

In cases where the encoder network 102 includes one or more recurrent components, the binary code representation of an encoded input image may be a compressed representation of an input image for the current time step. For example, a generated binary code representation of an encoded input image for a time step t may include a binarized stream $\{-1, 1\}^m$ where m represents the number of generated bits. If the total number of time steps t is equal to k, the binarizer 104 may be configured to generate as output mk bits in total. Unlike the encoder network 102 and decoder network 106, the binarizer 104 may be stateless—that is the binarizer 104 may not maintain an internal state that may be propagated to subsequent time steps.

The number of bits m in each generated binary code representation may be dependent on the number of neural network nodes in the binarized neural network layer, and may be varied by varying the number nodes in the binarizer neural network layer prior to training. Varying the number of nodes in the binarizing neural network layer may allow for a visual fidelity of the compressed images to be controlled. For example, the number of bits m in the binary code representation may be equal to a number of rows of a linear weight matrix that is used to transform an activation from a previous layer in the neural network system, e.g., a final layer of the encoder network 102. In some cases the neural network system 100 may be fully convolutional. In these cases, m may be a linear function of input size. The binarizing neural network layer enables control of the neural network system compression rate by putting constraints on the bit allowance, and helps force the network to learn efficient representations.

In some cases, a generated binary code representation of an encoded image, e.g., binary code representation 118 of encoded image 116 may be provided as a neural network system output, e.g., as a final compressed representation of the neural network system input image. Generating a neural network system 100 output is described in more detail below with reference to FIG. 4.

In these cases, the binarizer 104 may include or be followed by an entropy encoding layer. The entropy encoding layer may be configured to receive a generated binary code representation of an encoded image and to perform entropy coding on the binary code in order to compress the binary code by representing frequently occurring patterns with few bits and rarely occurring patterns with many bits. In some implementations the entropy encoding layer may perform non-spatial entropy encoding, i.e., a type of encoding that captures redundancy across the depth of received binary code. In other implementations the entropy encoding layer may use a binary recurrent neural network architecture to perform entropy encoding.

In other cases, a generated binary code representation of an encoded image, e.g., binary code representation 118 of encoded image 116 may be provided as input to the decoder network 106.

The decoder network 106 is configured to receive a binary code representation of an input image, e.g., binary code representation 118, and to process the received binary code representation to generate a reconstruction of the input image 114. In some cases the generated reconstruction of the input image 114 may be an intermediate reconstruction of the input image 114, e.g., intermediate input image estimate 120, which is provided to another component in the neural network system 100 for further processing. For example, in some cases the generated intermediate reconstruction of the input image may be provided to the residual error calculator 108, additive image reconstruction module 110 or gain estimator module 112 for further processing, as described below. In other cases the generated reconstruction of the input image 114 may be a final reconstruction of the input image 114, and may be directly provided as a neural network system output, e.g., reconstructed input image 126a.

In some implementations the decoder network 106 includes one or more recurrent network components, e.g., one or more recurrent neural network layers, that process a received input sequence of binary code representations of input images at respective time steps and generate an output sequence of reconstructions of the input images for the time steps. The decoder network weights that parameterize the decoder network 106 may be shared over each of the time steps, and the internal states of the recurrent network components for a current time step may be propagated to the next time step. An example decoder network 106 is described in more detail below with reference to FIG. 3.

As described above, in some implementations, the generated intermediate reconstruction of the input image, e.g., intermediate input image estimate 120, may be provided to a residual error calculator module, e.g., residual calculator 108. The residual error calculator 108 is configured to determine a residual error between the received intermediate input image estimate 120 and the input image 114. The residual error 122 may also be represented as an image.

The residual error calculator 108 is configured to provide the encoder network 102 with the determined residual error, e.g., residual error 122. In some implementations the determined residual error may be a scaled residual error. Generating a scaled residual error is described in more detail below with reference to the gain estimator module 112.

The neural network system 100 may be configured to iteratively repeat the above described process using the residual error 122 as a subsequent neural network system input, i.e., processing the residual error 122 using the encoder network 102, binarizer 104, decoder network 106 and residual error calculator 108 to generate a subsequent residual error. In some cases, the neural network system 100 may be configured to repeat the process until a determined residual error is below a predetermined error threshold. The image compression rate is determined by the number of bits generated by the binarizer 104 at each iteration, and the number of iterations. For example, for a fixed number of iterations, increasing the number of bits generated by the binarizer 104 at each iteration may improve the image compression rate (although in some implementations this may involve re training the neural network system for each iteration). Alternatively, for a fixed number of bits generated by the binarizer 104 at each iteration, increasing the number of iterations may reduce the image compression rate.

In cases where the encoder network 102 and decoder network 106 respectively include one or more recurrent network components, e.g., one or more recurrent neural network layers, the neural network system 100 may be configured to iteratively repeat the above described process at each of multiple time steps. As described above, the encoder network weights and decoder network weights may be shared between iterations, and the states of the recurrent network components may be propagated to the next time step. Therefore, the image compression performed by the encoder network 102 and binarizer 104, and the image reconstruction performed by the decoder network 106, may be progressive. In some implementations, the accuracy of an image compression may increase as more bits are processed by the neural network system 100, e.g., as more iterations of the process are performed by the neural network system 100. However, more iterations of the process reduce the compression rate, incurring a tradeoff between image quality and compression rate as described above.

The components required to perform a single iteration of processing a received input image, e.g., input image 114 or a residual error 122, performed by the neural network system 100 are enclosed by the dashed lines in FIG. 1. The single t-th iteration of the neural network system 100 may be represented by the below equations $$b_t = B(E_t(x, r_{t-1})),$$

$$\hat{x}_t = D_t(b_t)\gamma \hat{x}_{t-1},$$

$$r_t = x - \hat{x}_t,$$

$$r_0 = x, \hat{x}_0 = 0 \qquad (1)$$

where $E_t$ and $D_t$ represent the encoder network and decoder network at iteration t, respectively, B represents the binarizer, $b_t$ represents the progressive binary code representation for the iteration, $\hat{x}_t$ represents the progressive reconstruction of the original image x with $\gamma=0$ for "one shot" reconstruction, or $\gamma=1$ for additive reconstruction, and $r_t$ represents the residual error of x and the reconstruction $\hat{x}_t$.

As described above, in some implementations the neural network system 100 may be configured to reconstruct an input image from a binary code representation of the input image. For example, a generated reconstruction of an input image as generated by the decoder network 106, e.g., corresponding to a single iteration of the above described process, may be directly provided as a neural network system output, e.g., reconstructed input image 126a. This reconstruction process may be referred to as "one-shot reconstruction," since during each iteration the decoder network 106 may be configured to use a current context, e.g., internal recurrent state, and received binary code representation to generate the reconstructed input image 126a.

Alternatively, as described above, in some implementations multiple generated reconstructions of an input image as generated by the decoder network 106, e.g., corresponding to each iteration of the above described process, may be provided to the additive image reconstruction module 110 for further processing. For example, the additive image reconstruction module 110 may be configured to generate a reconstructed input image 126b that is a sum of all outputs of all previous iterations.

Alternatively, as described above, in some implementations a generated reconstruction of an input image as generated by the decoder network 106, e.g., corresponding to a final iteration of the above described process, may be provided to the gain estimator module 112 for further processing. For example, the gain estimator module 112 may be configured to extend the operations performed by the additive image reconstruction module 110 to include a content-dependent, iteration-dependent gain factor.

As described above, the neural network system 100 shares encoder network and decoder network weights across iterations. This construction may allow for better final compression results, e.g., due to a consequent reduction in search space, but may not reflect a natural progression of successive improvement during the iterations. For example, large changes may need to be made to a decoded reconstruction for a first number of iterations. Therefore, changes that may be required to be made to a generated reconstruction of an input image at an early stage may be much larger in amplitude than refinements that may be required in later iterations. In addition, the speed with which the residual error drops off may be content dependent. In some patches of the image, e.g., uniform regions, the drop-off may be much more dramatic than in other patches (e.g., highly textured patches). The gain estimator module 112 accommodates these changes in amplitude range and their content-dependent nature.

As described above, in some implementations a determined residual error that is provided to the encoder network 102, e.g., residual error 122, may be a scaled residual error. A scaled residual error is a residual error that has been scaled by a gain factor so that the amplitude of the residual error provided to the encoder network 102 is in a better operational range of the encoder network 102. The gain factors may be estimated from a previous output of the decoder network 106. Scaled residual errors may be determined using the gain estimator module 112. For example, the residual error calculator 108 may be configured to provide the gain estimator module 112 with an initial determined residual error, and may be configured to receive a scaled residual error from the gain estimator module 112.

Gain factors determined by the gain estimator module 112 may be space-dependent or may be different for each pixel of the image. For example, the gain estimator module 112 may be configured to determine a gain factor for each patch of a received reconstruction of the input image, e.g., intermediate input image estimate 120, as generated by the decoder network 106 for a previous iteration, e.g., using a trained auxiliary neural network. The gain estimator module 112 may be configured to then multiply a residual error for the reconstruction of the input image for the current iteration, as calculated by the residual error calculator 108, by the determined gain factors to generate a scaled residual error. Equations (1) above then become $g_t = G(\hat{x}_t)$ $b_t = B(E_t(r_{t-1} \odot G(\hat{x}_{t-1})))$, $\hat{r}_{t-1} = D_t(b_t) \oslash G(\hat{x}_{t-1})$, $\hat{x}_t = \hat{x}_{t-1} + \hat{r}_{t-1}$ $r_t = x - \hat{x}_t$ $g_0 = 1, r_0 = x$ where $\oslash$ represents element wise division, $\odot$ represents element wise multiplication, $\hat{r}_t$ represents the residual error of x and the reconstruction $\hat{x}_t$, and $G(.)$ estimates the gain factor, $g_t$, using a multiple-layer, e.g., five layers, feedforward convolutional neural network. The convolutional neural network layers may each implement stride, e.g., stride of two. A first number of layers, e.g., the first four layers, may give an output depth of a fixed size, e.g., 32 by 32 using a convolutional kernel, e.g., 3 by 3, with an ELU nonlinearity. The final layer may give an output depth of 1, e.g., using a 2 by 2 convolutional kernel, with an ELU nonlinearity. Since ELU has a range of (−1, infinity) a constant of two may be added to the output of the neural network to obtain $g_t$ in the range of (1, infinity).

Scaled residual errors may be provided to the encoder network 102 for the next iteration. In cases where the encoder network 102 receives a scaled residual error for processing, an output of the decoder network 106 corresponding to the scaled residual error received by the encoder network 102 may require a gain compensation to bring the decoder network output back to the original scale. The gain estimator module 112 may be configured to determine and to apply gain compensations to a decoder output, e.g., intermediate input image estimate 120. In some implementations a gain compensation applied to a decoder output may be used to generate a reconstructed input image output, e.g., reconstructed input image output 126c.

The neural network system 100 may be trained using a single training procedure to learn to generate compressed representations of received input images. In some implementations, the training procedure may be independent of the dimension of the received input images or a desired compression rate of the generated compressed representations of received input images. During training, a $L_1$ loss may be calculated on the residuals generated at each iteration. The total loss for the network may therefore be given by the below equation $$\sum_{t=1}^{T} \alpha_t \cdot |r_t|$$

where $r_t$ represents the residual error of x and the reconstruction $\hat{x}_t$ for the time step t, and $\alpha_t$ is a weight for time step t.

The neural network system 100 may be trained using conventional machine learning techniques. For example, the neural network system 100 may be trained on a set of training data by processing training inputs included in the set of training data to generate corresponding outputs. The generated outputs may then be compared to known training outputs included in the set of training data by computing loss functions and backpropagating loss function gradients with respect to current neural network parameters to determine an updated set of neural network parameters that minimizes the loss functions.

Once the neural network system 100 has been trained, the system can be used to perform variable rate image compression by varying the number of iterations performed by the system to generate a compressed representation of a received input image. In addition, in cases where the system 100 includes multiple binarizing neural network layers, the system can be used to perform variable rate image compression by routing an encoded image to an appropriate binarizer to generate a binary code representation of an appropriate number of bits.

For convenience, the encoder network 102 and decoder network 106 are illustrated in FIG. 1 as being located in a same system. However, in some implementations the decoder network 106 and encoder network 102 may be distributed across multiple systems. That is, the decoder network 106 may be remote from the encoder network 102 and binarizer 104. For example, a received system input image, e.g., input image 114, may be compressed using the encoder network 102 and binarizer 104 at one end, and transmitted to the decoder network 106 at another end point, where it may be reconstructed and provided as a system output.

Figure 2:
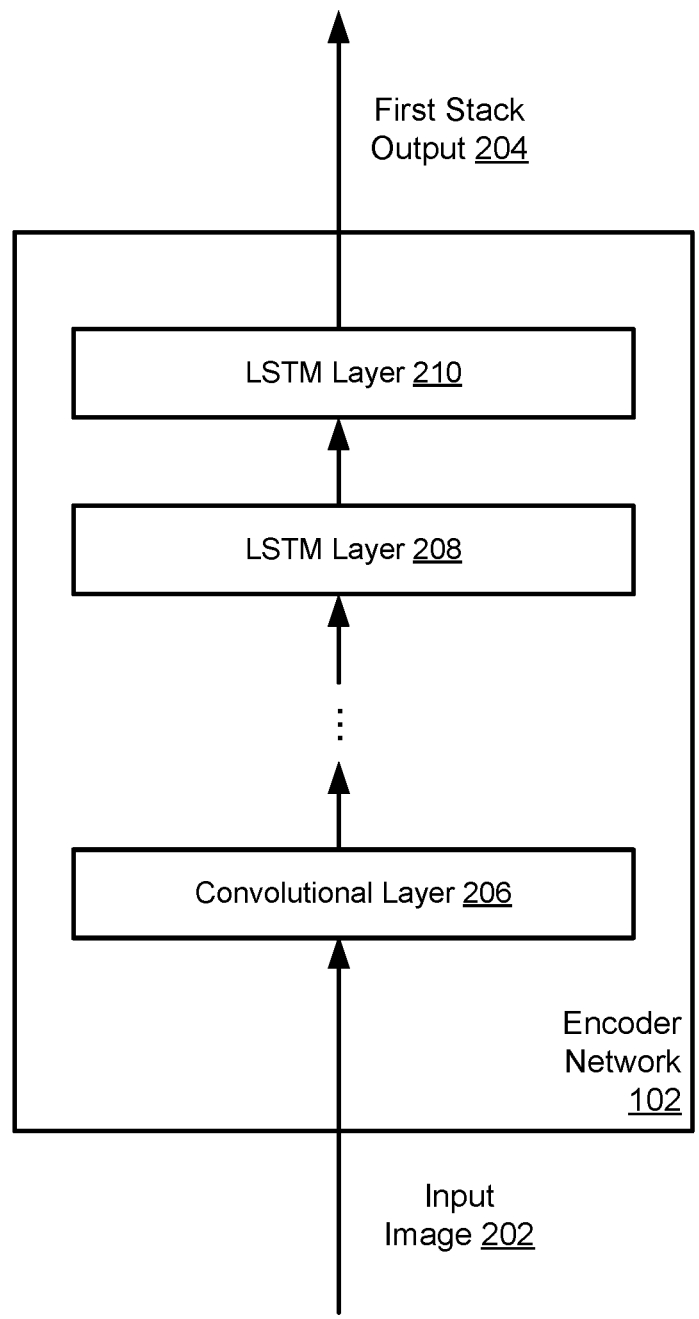
FIG. 2 shows an example encoder sub network.

FIG. 2 shows an example encoder network 102, as described above with reference to FIG. 1. The encoder network 102 is configured to receive an input image, e.g., input image 202, and to generate an encoded representation of the input image, e.g., first stack output 204. The received input image may be a system input image, e.g., system input image 114 of FIG. 1 above, or an input image that is derived from a system input image, e.g., residual error 122.

The encoder network 102 includes a first stack of neural network layers, e.g., neural network layers 206-210. For convenience, the first stack of neural network layers illustrated in FIG. 2 includes at least three neural network layers, however in some implementations the first stack of neural network layers may include more or fewer neural network layers. In addition, although not illustrated in FIG. 1, in some implementations the first stack of neural network layers may include an output layer that may be configured to project a received layer input into the resolution of the input image received by the neural network system 100.

As described above with reference to FIG. 1, the encoder network 102 may include one or more recurrent network components, e.g., one or more recurrent neural network layers. The first stack of neural network layers may therefore be configured to, at each of multiple time steps, receive an input image for the time step generate a corresponding first stack output. The generated first stack output is an encoded representation of the received input image.

The first stack of neural network layers may include one or more long short term memory (LSTM) neural network layers, e.g., LSTM neural network layers 208 and 210. An example neural network that includes one or more LSTM neural network layers is described in more detail in "Long Short-Term Memory Based Recurrent Neural Network Architectures for Large Vocabulary Speech Recognition," Haşim Sak, Andrew Senior, Francoise Beaufays, http://arxiv.org/abs/1402.1128.

The first stack of neural network layers may further include one or more non-LSTM neural network layers, e.g., convolutional layer 206. In some implementations the first stack of neural network layers may include one or more fully connected neural network layers. In saddition, in some implementations the first stack of neural network layers may include one or more gated recurrent neural network layers. Gated recurrent neural network layers are described in detail in "Empirical Evaluation of Gated Recurrent Neural Networks on Sequence Modeling," Chung et al, https://arxiv.org/abs/1412.3555.

For example, as shown in FIG. 2, in some implementations the first stack of neural network layers may include one convolutional neural network layer 206 followed by two stacked LSTM layers. As another example, in some implementations the first stack of neural network layers may include one or more LSTM neural network layers and one or more convolutional LSTM neural network layers.

Figure 3:
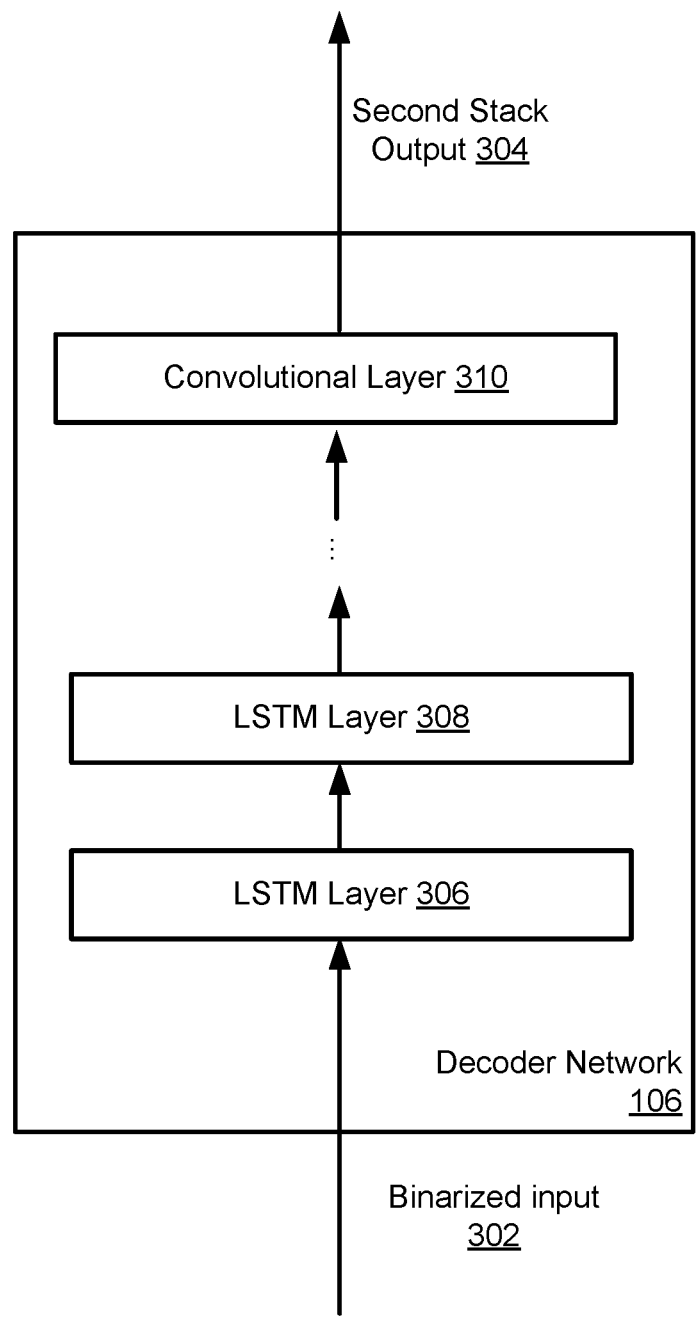
FIG. 3 shows an example decoder subnetwork.

FIG. 3 shows an example decoder network 106, as described above with reference to FIG. 1. The decoder network 106 is configured to receive an encoded representation of the system input image, e.g., binarized input 302, and to generate an output image that is a reconstruction of the system input image, e.g., second stack output 304. The received encoded representation may be an encoded representation of a system input image, e.g., system input image 114 of FIG. 1 above, or an encoded representation of an input image that is derived from a system input image, e.g., residual error 122.

The decoder network 106 includes a second stack of neural network layers, e.g., neural network layers 306-310. For convenience, the second stack of neural network layers illustrated in FIG. 3 includes at least three neural network layers, however in some implementations the second stack of neural network layers may include more or fewer neural network layers.

As described above with reference to FIG. 1, the decoder network 106 may include one or more recurrent network components, e.g., one or more recurrent neural network layers. The second stack of neural network layers may therefore be configured to, at each of a plurality of time steps, receive a binarized output for the time step and generate a corresponding second stack output. In some implementations the generated second stack output is a reconstruction of the system input image.

The second stack of neural network layers may include one or more LSTM neural network layers, e.g., LSTM neural network layers 306 and 308. The second stack of neural network layers may include one or more associative LSTM neural network layers. Associative LSTM neural network layers are an extension of LSTM neural network layers that use holographic representations. An example neural network that includes one or more associative LSTM neural network layers is described in more detail in "Associative long short-term memory," Danihelka et al, https://arxiv.org/abs/1602.03032.

The second stack of neural network layers may further include one or more non-LSTM neural network layers, e.g., convolutional neural network layer 310. In some implementations the second stack of neural network layers may include gated recurrent neural network layers. In addition, in some implementations the second stack of neural network layers may include one or more fully connected neural network layers.

For example, as shown in FIG. 3, in some implementations the second stack of neural network layers may include two stacked LSTM layers, e.g., LSTM layers 306 and 308, followed by a convolutional neural network layer, e.g., convolutional layer 310. As another example, in some implementations the second stack of neural network layers may include one or more LSTM neural network layers and one or more deconvolutional LSTM neural network layers. In this example, the final layer of the second stack of neural network layers may include a convolution with three filers that convert a received final layer input into RGB values.

Figure 4:
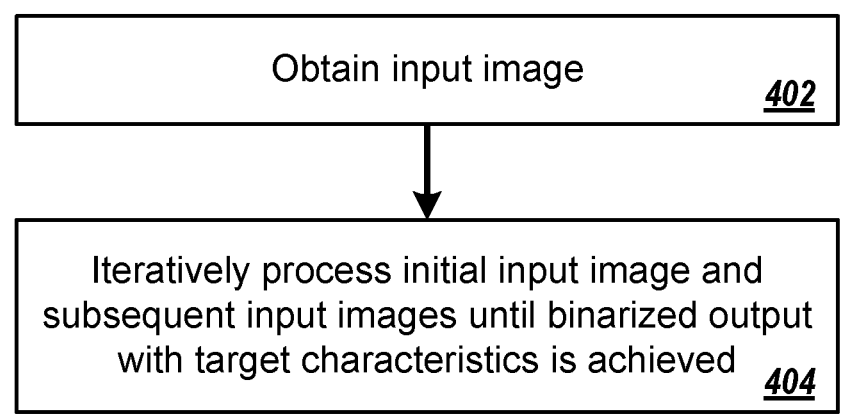
FIG. 4 is a flow diagram of an example process for compressing an image.

FIG. 4 is a flow diagram of an example process 400 for compressing an image. The process 400 will be described as being performed by a system of one or more computers located in one or more locations. For example, a system configured to perform image compression, e.g., the neural network system 100 of FIG. 1, appropriately programmed in accordance with this specification, can perform the process 400.

The system obtains an initial input image (step 402).

The system iteratively processes the initial input image and subsequent input images using a neural network system until a binarized output, i.e., a compressed representation of the received initial input image, with target characteristics is achieved (step 404). For example, the target characteristics may include a target image quality metric or a target image compression rate. Since the compression rate is dependent on the total number of bits generated by the neural network system, which in turn is dependent on the number of bits generated by the neural network system in a single iteration and the total number of iterations performed by the system, the target compression rate may be defined by selecting an appropriate number of iterations. Alternatively or in addition, the target compression rate may be defined by selecting an appropriate number of bits output by the system at each iteration. An example iteration of processing the initial input image or subsequent input images using a neural network system configured to perform image compression is described in more detail below with reference to FIG. 5.

Figure 5:
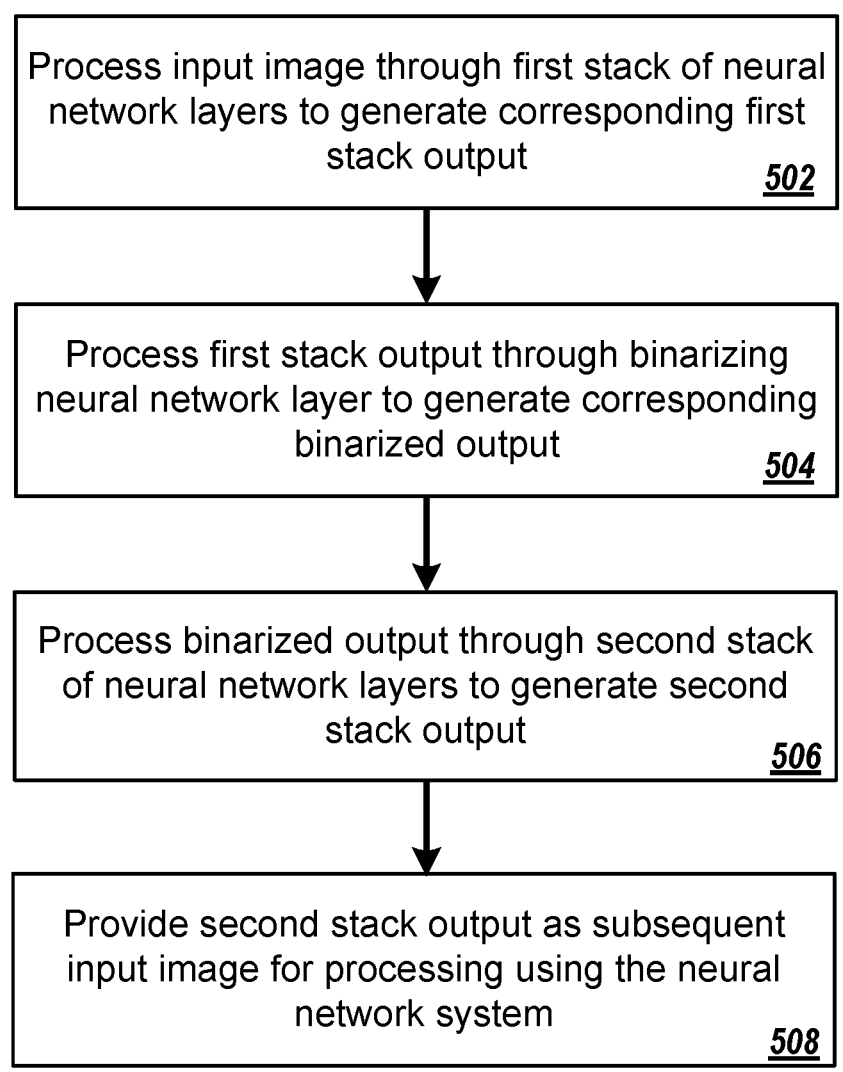
FIG. 5 is a flow diagram of an example iteration of processing an input image using a neural network system.

FIG. 5 is a flow diagram of an example iteration 500 of processing an input image using a neural network system. The process 500 will be described as being performed by a system of one or more computers located in one or more locations. For example, a neural network system configured to perform image compression, e.g., the neural network system 100 of FIG. 1, appropriately programmed in accordance with this specification, can perform the process 500.

The system processes the input image for the iteration through a first stack of neural network layers including one or more LSTM neural network layers and one or more non-LSTM neural network layers to generate a corresponding first stack output (step 502). For example, for a first iteration the system may process a system input image, e.g., an original image such as system input image 114 of FIG. 1, through the first stack of neural network layers. For subsequent iterations, the system may process a residual error image representing a difference between an original system input image and a reconstruction of the original system input image for a previous iteration, e.g., residual error 122 of FIG. 1, through the first stack of neural network layers.

Since the first stack of neural network layers includes one or more recurrent neural network layers, i.e., LSTM neural network layers, the system processes the input image for the iteration using an internal state that has been propagated from previous iterations, e.g., the iteration before the current iteration, to the current iteration. The input image for the iteration is therefore processed in a context that is specific to the current iteration.

The system processes the first stack output through a binarizing neural network layer configured to generate a corresponding binarized output (step 504). The binarized output is a compressed representation of the input image, e.g., a binarized stream f 1r where m represents the number of bits in the binarized output. As described above with reference to FIG. 1, the number of bits m in the binarized output may be a predetermined number that is equal to a desired number of bits in the compressed input image. For example, a desired number of bits in the compressed input image may be determined prior to training, so that the system is pre-configured to generate binarized outputs of a desired size.

The system processes the binarized neural network output through a second stack of neural network layers including one or more LSTM neural network layers and one or more non-LSTM neural network layers to generate a second stack output (step 506). Since the second stack of neural network layers includes one or more recurrent neural network layers, i.e., LSTM neural network layers, the system processes the binarized neural network output for the iteration using an internal state that has been propagated from previous iterations, e.g., the iteration before the current iteration, to the current iteration. The binarized neural network output for the iteration is therefore processed in a context that is specific to the current iteration.

The system provides the generated second stack output as part of a subsequent input image for processing using the neural network system (step 508). For example, as described above with reference to FIG. 1, the system may provide a residual error that is derived from the generated second stack output as a subsequent input image for processing at a next iteration. Alternatively, as described above with reference to FIG. 1, the system may provide the generated second stack output as a reconstructed input image output.

In some implementations the input image described above with reference to step 402 of FIG. 4 and step 502 of FIG. 5 may be a patch, e.g., a sub-image, of a larger image. In these implementations the system may process each other patch of the larger image to generate corresponding binarized outputs for each patch of the larger image.

Each of the binarized outputs may have target characteristics that are independent to the other binarized outputs. For example, in some implementations an input image may include one or more patches of uniform regions, e.g., regions with few variations such as a clear blue sky, and one or more highly textured regions, e.g., regions with many variations such as those including objects. In these implementations it may be beneficial, e.g., in terms of computational efficiency, to specify that a uniform region be compressed at a lower image quality than a highly textured region, since a low image quality compression of a uniform region is less likely to lose important information than a low image quality compression of a highly textured region. As another example, each of the binarized outputs may have varying image compression rates. For example, the system may perform less iterations when processing uniform regions than the number of iterations performed when processing highly textured regions.

Figure 6:
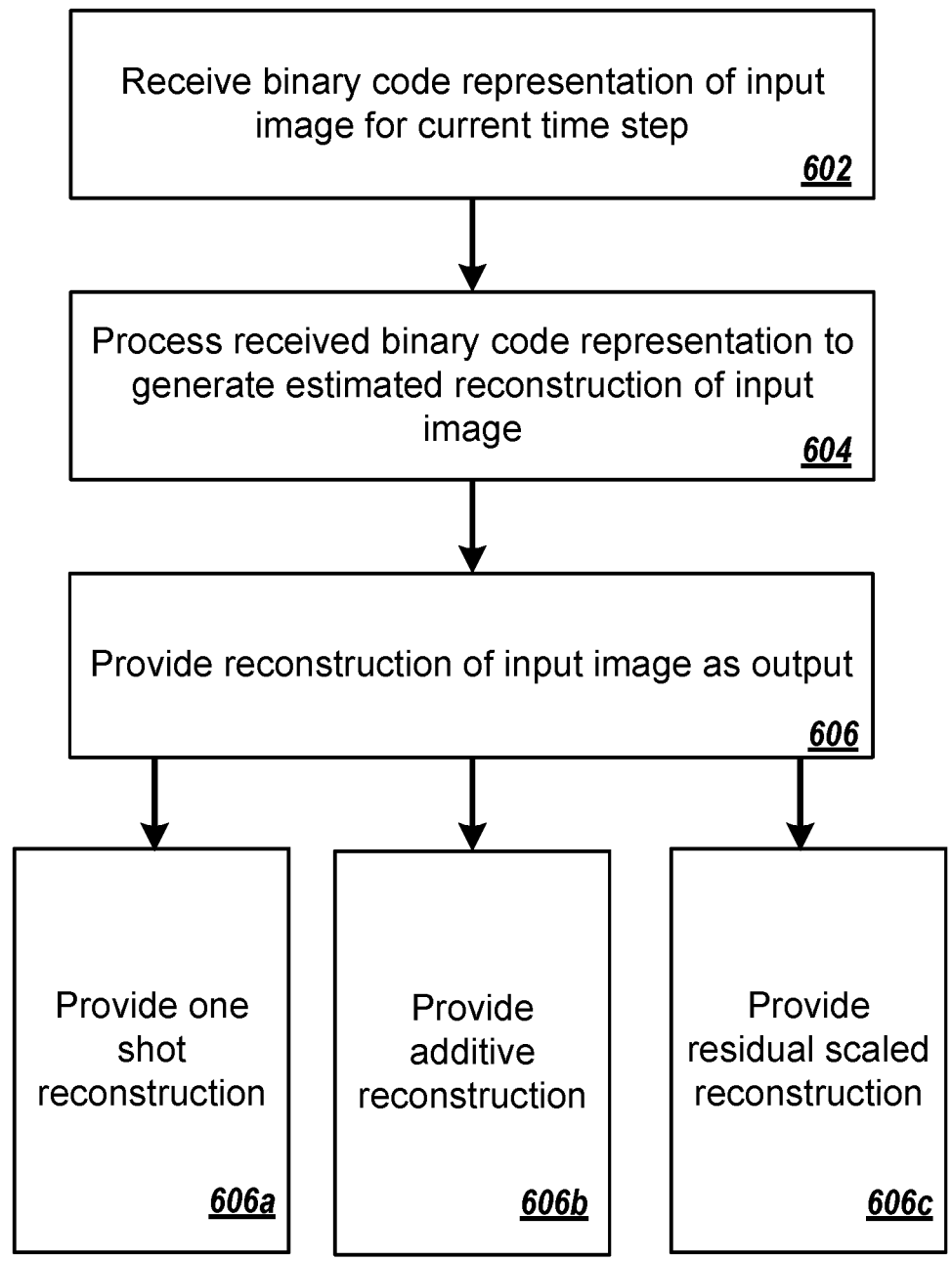
FIG. 6 a flow diagram of an example process for reconstructing a compressed input image using a decoder network.

FIG. 6 is a flow diagram of an example process 600 for reconstructing a compressed input image using a decoder network. The process 600 will be described as being performed by a system of one or more computers located in one or more locations. For example, a neural network system configured to perform image compression, e.g., the neural network system 100 of FIG. 1, appropriately programmed in accordance with this specification, can perform the process 600.

The system receives a binary code representation of a system input image for a current time step t (step 602). As described above with reference to FIG. 1, the binary code representation of the system input image may be a compressed representation of the system input image for the time step t.

The system processes the received binary code representation to generate an estimated reconstruction of the input image for the time step t (step 604). Processing a received binary code representation to generate an estimated construction of an input image is described in more detail above with reference to FIG. 1.

The system provides a reconstruction of the input image as output (step 606).

In some implementations, the system may provide a "one-shot" reconstruction of the input image as output (step 606a). For example, in some implementations the system may estimate the input image after each iteration, i.e., for each time step t. The system may then reconstruct the input image directly from the received binary code representation of the input image for the time step.

In some implementations, the system may provide an additive reconstruction of the input image as output (606b). For example, the system may provide a reconstruction of the input image that is a sum of all outputs of all previous iterations as output.

In some implementations, the system may perform residual scaling to provide a reconstruction of the input image as output (606bc). For example, the system may extend the additive reconstruction scheme described above to include a content-dependent, iteration-dependent gain factor, as described above with reference to FIG. 1.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method for reconstructing an image, comprising:
   obtaining a compressed representation of an input image, the compressed representation comprising a respective representation at each of a plurality of time steps;
   generating a reconstruction of the input image from the compressed representation, comprising:
   at each of the plurality of time steps:
   processing the representation at the time step, to generate an output image for the time step, using a decoder recurrent neural network that includes a stack of neural network layers, and
   generating an additive reconstruction from the output image for the time step and the output images at previous time steps; and
   generating the reconstruction of the input image from the additive reconstruction after the last time step of the plurality of time steps.

2. The method of claim 1, wherein the compressed representation of the input image is a binary code representation of the input image.

3. The method of claim 1, wherein the stack of neural network layers includes one or more associative LSTM neural network layers.

4. The method of claim 1, wherein the stack of neural network layers includes one or more gated recurrent neural network layers.

5. The method of claim 1, wherein the stack of neural network layers includes one or more fully-connected neural network layers.

6. The method of claim 1, wherein the stack of neural network layers includes a plurality of stacked LSTM layers followed by one or more convolutional neural network layer.

7. The method of claim 1, wherein the stack of neural network layers includes one or more LSTM neural network layers and one or more deconvolutional LSTM neural network layers.

8. The method of claim 1, wherein a final layer of the stack of neural network layers performs a convolution with three filters that converts a received final layer input into RGB values.

9. The method of claim 1, wherein generating an additive reconstruction from the output image for the time step and the output images at previous time steps comprises adding the output image for the time step to an additive reconstruction from a preceding time step in the plurality of time steps.

10. The method of claim 1, wherein a difference between an output image for a first time step and an output image for a time step following the first time step is larger in amplitude than a difference between an output image for a second time step and an output image for a time step following the second time step.

11. One or more non-transitory computer-readable media having instructions stored thereon that, when executed by one or more processors, cause the one or more processors to perform operations comprising:
    obtaining a compressed representation of an input image, the compressed representation comprising a respective representation at each of a plurality of time steps;
    generating a reconstruction of the input image from the compressed representation, comprising:
    at each of the plurality of time steps:
    processing the representation at the time step, to generate an output image for the time step, using a decoder recurrent neural network that includes a stack of neural network layers; and
    generating an additive reconstruction from the output image for the time step and the output images at previous time steps; and
    generating the reconstruction of the input image from the additive reconstruction after the last time step of the plurality of time steps.

12. The one or more non-transitory computer-readable media of claim 11, wherein the compressed representation of the input image is a binary code representation of the input image.

13. The one or more non-transitory computer-readable media of claim 11, wherein the stack of neural network layers includes one or more associative LSTM neural network layers.

14. The one or more non-transitory computer-readable media of claim 11, wherein the stack of neural network layers includes one or more gated recurrent neural network layers.

15. The one or more non-transitory computer-readable media of claim 11, wherein the stack of neural network layers includes one or more fully-connected neural network layers.

16. The one or more non-transitory computer-readable media of claim 11, wherein the stack of neural network layers includes a plurality of stacked LSTM layers followed by one or more convolutional neural network layer.

17. The one or more non-transitory computer-readable media of claim 11, wherein the stack of neural network layers includes one or more LSTM neural network layers and one or more deconvolutional LSTM neural network layers.

18. The one or more non-transitory computer-readable media of claim 11, wherein a final layer of the stack of neural network layers performs a convolution with three filters that converts a received final layer input into RGB values.

19. The one or more non-transitory computer-readable media of claim 11, wherein generating an additive reconstruction from the output image for the time step and the output images at previous time steps comprises adding the output image for the time step to an additive reconstruction from a preceding time step in the plurality of time steps.

20. A system comprising one or more computers and one or more storage devices storing instructions that when executed by one or more computers cause the one or more computers to perform operations comprising:
    obtaining a compressed representation of an input image, the compressed representation comprising a respective representation at each of a plurality of time steps;
    generating a reconstruction of the input image from the compressed representation, comprising:
        at each of the plurality of time steps:
            processing the representation at the time step, to generate an output image for the time step, using a decoder recurrent neural network that includes a stack of neural network layers; and
            generating an additive reconstruction from the output image for the time step and the output images at previous time steps; and
        generating the reconstruction of the input image from the additive reconstruction after the last time step of the plurality of time steps.

\* \* \* \* \*